Jan. 28, 1930.  J. W. ENRIGHT  1,745,251
SHRIMP TRAWLING DEVICE
Filed May 16, 1928  2 Sheets-Sheet 1
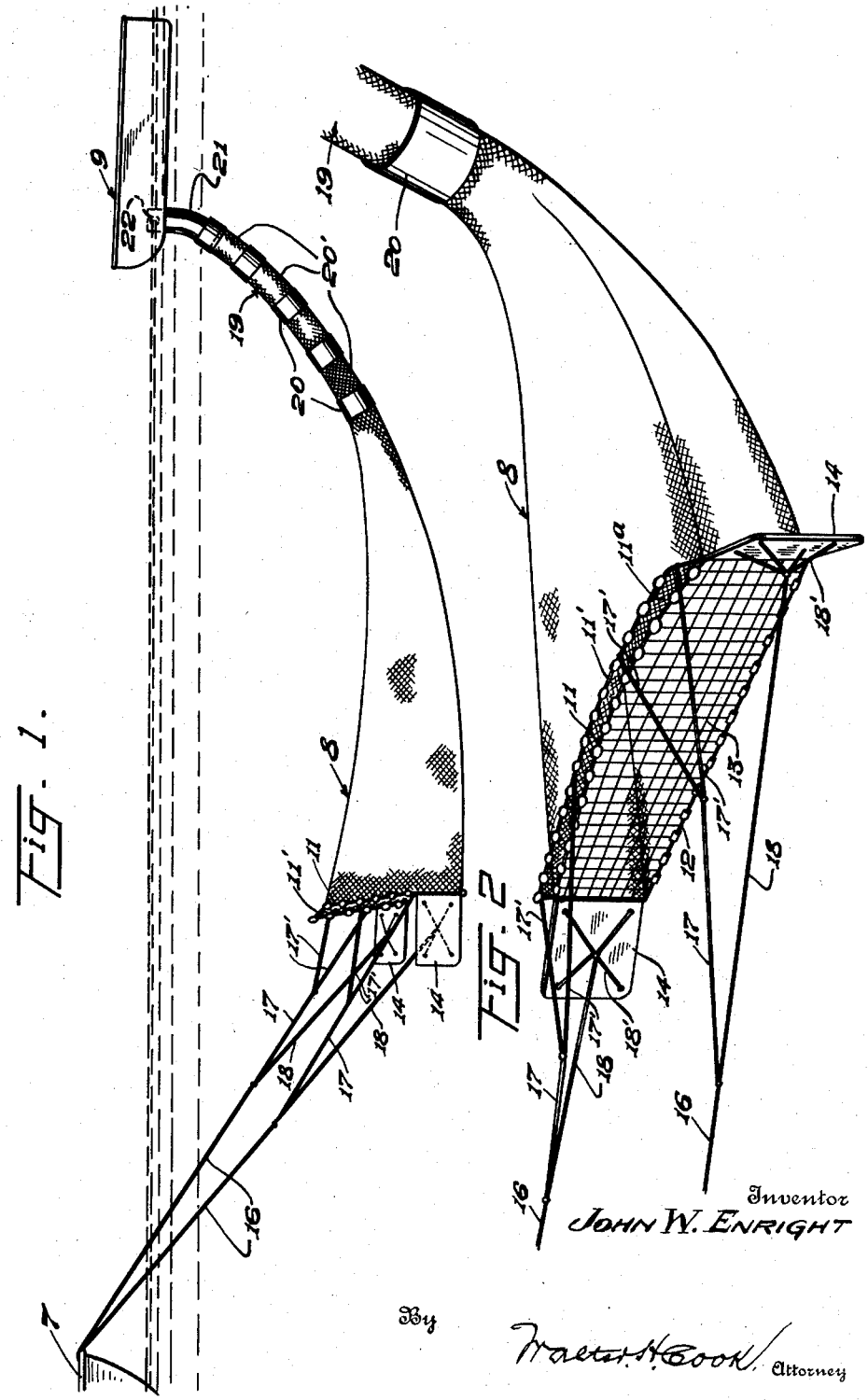

Jan. 28, 1930. J. W. ENRIGHT 1,745,251
SHRIMP TRAWLING DEVICE
Filed May 16, 1928 2 Sheets-Sheet 2
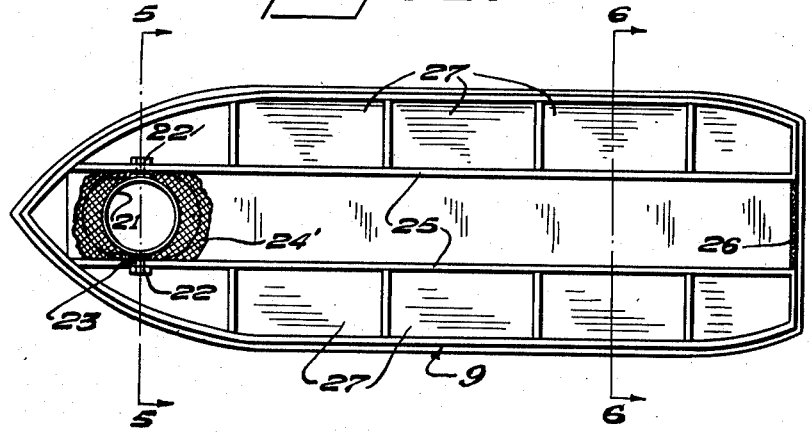
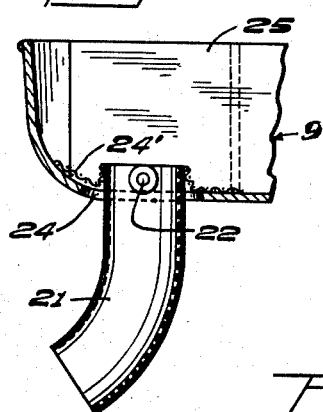
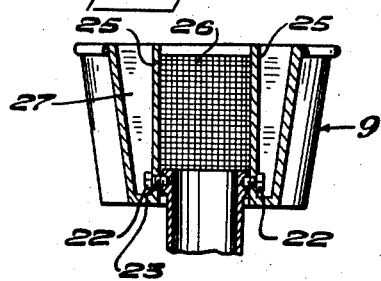
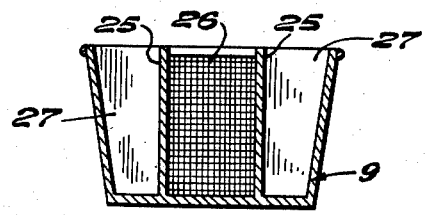
Inventor
JOHN W. ENRIGHT
By Walter H. Cook, Attorney Patented Jan. 28, 1930

1,745,251

UNITED STATES PATENT OFFICE

JOHN W. ENRIGHT, OF NEW ORLEANS, LOUISIANA

SHRIMP-TRAWLING DEVICE

Application filed May 16, 1928. Serial No. 278,109.

This invention relates to improvements in shrimp-trawling devices, one object of the invention being the provision of a trawl so constructed and arranged that the same can be towed so that the lead line thereof will contact the bottom of the water-bed with the upper forward edge projected in front thereof so as to assist in directing the shrimp into the net, there being provided means for delivering the entrapped shrimp to a floating receptacle to utilize the inrushing waters, or, rather, the movement of the net through the water so as to feed the catch into such floating receptacle.

Another object of this invention is the provision of a device of this character which does not necessitate the withdrawing of the trawl net from the water at each catch as the same can be used for continuous catching, it being merely necessary to attach the forward end to a towing boat or launch while the outlet end is connected to a floating boat or receptacle into which the same empties.

Another object of this invention is the provision of means whereby the operators of the device can locate immediately the position at which the catch is made so that a buoy may be tossed overboard to indicate the spot and also whereby the catch, when directed into the floating receptacle, is sorted and the smaller ones released without handling.

In the accompanying drawings:—

Figure 1 is a perspective view showing the present trawling device in operation;

Figure 2 is a perspective view taken from the inlet end of the trawling net, the outlet end being broken off;

Figure 3 is a top plan view of the floating receptacle;

Figure 4 is a vertical sectional view through the forward end thereof showing the method of attaching the directing or outlet end of the trawl thereto;

Figure 5 is a section taken on line 5—5 of Figure 3; and

Figure 6 is a section taken on line 6—6 of Figure 3.

Referring to the drawings, the numeral 7 designates the towing boat, which may be a power-boat of any type so as to properly pull or tow the trawling net 8 and the receiving and sorting floating receptacle or boat 9.

The trawling device comprises an elongated, or rectangular in cross-section, funnel shaped net having at the forward end thereof the double cork line or float line 11 and 11′, the line 11′ being connected to the wing or flap 11ª which constitutes a means that will be projected forwardly of the lead line 12 during the trawling movement of the present net through the water, the lead line having a tendency to sag rearwardly. The enlarged or entrance end of the net is covered by a netting 13 the meshes of which are of a size that will exclude the undesirable larger fish and also prevent the ingress of sharks to feed upon the captives.

Attached to each side of the mouth of the netting are the usual trawl-boards 14 which are inclined slightly forward thereof, as indicated in Figures 1 and 2, during towing of the apparatus. The two tow lines 16 are connected in bridle style to the rear end of the towing boat or launch 7, and each is connected to the two lines 17, one of which extends rearwardly and is connected to an additional line 17′ and through the two lines 17′ to the flap 11ª, while the line 18 is connected through the bridle 18′ to the respective trawl-boards 14. The arrangement of these lines may be changed according to the desired angularity of the respective parts, but it being essential that the trawl-boards be projected slightly forward of the entrance end and bridled so that when a pull is exerted on the main tow lines 16, by the power boat 7, the trawl-boards 14 move forward, downwardly, and outwardly, so that the mouth of the trawl 8 will move along the bottom of the water bed opened to its maximum width and will remain so as long as the tow boat is pulling from the sides while the netting flap 11ª should be projected forwardly of the entrance end and considerably in advance of the lead line 12, as the shrimp, when frightened by the moving trawl, tend to swim upwardly and away from the mouth, and if this flap 11ª is not projected forwardly of the lead line, a great many of the shrimp will pass above the mouth of the net and will, therefore, not be made captive.

The outlet end 19 of the netting is made substantially cylindrical and is composed of alternate canvas sections 20 and net sections 20', the upper canvas section being connected fixedly to the metal tubular member or elbow 21 which, in turn, is connected by means of the swivel pins 22 to the supports 23 of the floating receptacle 9. The upper end of the elbow 21 is, therefore, projected through and above the bottom of the float and through the opening 24, there being net sections 24' provided to prevent the escape of the catch through the space around the section 21, said opening 24 being made sufficiently large to permit the necessary swinging movement to accommodate the present device for use in various depths of water.

The receiving float 9, as clearly illustrated in Figures 3 to 6, is a flat boat-shaped member and is provided with two parallel walls 25 centrally thereof which provide the central receiving compartment of the boat with the netting 26 disposed at the rear end thereof, the mesh of which is of sufficeint size to entrap the desired sized shrimp but permit the escape of the smaller ones therethrough. This arrangement provides a sorting device for use simultaneously with the direction of the catch within the longitudinal chamber. There are provided upon opposite sides of this chamber a plurality of compartments 27 in which the shrimp may be dipped from the longitudinal chamber and placed therein as they are caught.

From the foregoing description, taken in connection with the drawings, the operation of the present device will be fully understood and the advantages thereof will be appreciated, but, briefly stated, the operation is as follows:—

The tow lines are properly positioned and attached to the tow boat 7 and the net lowered into the water to assume the position as shown in Figure 1 with the receiving float or boat 9 either towed through the intermediary of the netting or connected, if so desired, by tow lines to the launch 7. As the trawling net is moved through the water with the lead line engaging the bottom, the flap 11ª directs the shrimp to be caught through the enlarged mouth of the netting and toward the rear end thereof, the movement of the net throught the water causing, due to the alternating canvas sections 20, a flushing action which tends to impel the entrapped shrimp upwardly and through the elbow section 21 into the forward end of the sorting chamber of the receiving float 9. These fabric sections 20 also act as a means for holding the reduced end 19 properly open for the free movement of the water and catch therethrough.

Many advantages accrue to this type of shrimp trawl in that after once lowering the net into position it is unnecessary to take the same out of the water to release the catch, as is the present practice, and it is also possible for the man within the float 9 to watch the in-rushing catch, and, as he is equipped with buoys and weights or anchors, to toss the same into the water when he notices the shrimp entering the float, so that the schools of shrimp may be readily located without guesswork.

What is claimed is:—

1. In a trawling apparatus, the combination with a tow boat and a floating receptacle for the catch, of a funnel-shaped net with its enlarged end connected to the tow boat, and a reduced end for said net swivelly attached to and forming a communicating means between the net and the floating receptacle, said swivel connection compensating for varying depths of water.

2. In a trawling apparatus, the combination with a tow boat and a floating receptacle for the catch provided with a longitudinally open channel therethrough, said channel being sealed at its rear end with a segregating means, of a funnel-shaped net having its enlarged end connected to the tow boat, the lower edge of the same being provided with a lead line and the upper edge with a float line, a reduced end for said net, and a metal elbow connected as a continuation of the reduced end with its other end swingingly connected at the forward end of the segregating channel of the floating receptacle and forming an adjustable communicating means therebetween and the net.

3. A trawling apparatus including a funnel-shaped net having a reduced cylindrical end formed of alternating netting and fabric sections, and a metallic tube connected to the free end of the reduced end of the net and forming a swinging support and an outlet therefor.

4. A trawling apparatus including a funnel-shaped net having a reduced cylindrical end formed of alternating netting and fabric sections, and a float-carrying flap attached to the upper edge of the enlarged mouth of the net and adapted, when the net is towed, to be forward of the lower edge of the mouth of the net.

5. In a trawling apparatus, the combination with a tow-boat and a floating receptacle for receiving the catch above the level of the water, of a funnel-shaped net having its enlarged end connected to the tow-boat, the lower edge of the same being provided with a lead line and its upper edge with a float line, a float-carrying flap attached to the upper edge of the enlarged mouth of the net and adapted, when the net is towed, to be forward of the lower edge of the mouth of the net, two trawling boards attached to the opposite sides of the mouth of the net and adapted, when towed, to direct the lead line of the net to contact the bottom of the water bed and spread the mouth of the net to its maximum width, and a netting stretched across the entrance mouth of the funnel to exclude larger size fish.

6. A trawling device, including a boat, a trawl net attached thereto, a pair of trawl boards for opening the mouth of said trawl net and holding the trawl net on the sea-bottom, a float located aft of the trawl net having a hinged elbow to compensate for various depths of water, and a hollow element connecting the trawl net to the hinged elbow and through which the catch may pass from the trawl net to the float.

7. A trawling device, comprising means for utilizing the flow of water through the trawl to bring the catch to the surface of the water, said means including a power boat, a trawl behind the boat, a pair of trawl boards for opening the mouth of the trawl and holding same on the sea bottom, a catch receiving and sorting float on the surface of the water and spaced behind the trawl, a conduit leading from the trawl to the float through which the catch may pass from the trawl to and into the float, and a hinged coupling member connecting the conduit and float to vary the angularity of the conduit and compensate for the varying depths of water.

8. A trawling device, comprising means for utilizing the flow of water through the trawl to bring the catch to the surface of the water, said means including a power boat, a trawl behind the boat, a pair of tow lines connecting the trawl to the power boat, a net extension on the upper forward part of the trawl, a plurality of bridle lines connected to the tow lines and net extension for holding the said extension upward and forward of the trawl mouth, a net barrier stretched across the trawl mouth to exclude undesirable large fish, a pair of trawl boards for opening the mouth of the trawl and holding same on the sea bottom, a float on the surface of the water and spaced behind the trawl, a conduit composed of alternating sections of fabric and netting leading from the trawl to the surface through which the catch may pass, and a hinged member connecting the conduit to the float and compensating for the varying depths of water.

9. A trawling device including a power boat, a trawl having a lead line on the lower part of its mouth and a cork line on the upper part of its mouth, a pair of trawl boards spaced between the power boat and trawl for opening the mouth of the trawl and holding same on the sea bottom, a pair of tow lines connecting the trawl to the power boat, a plurality of bridle lines connected to the tow lines and the cork lines for maintaining the cork lines in a forward and upward position in relation to the lead lines, a surface float behind the trawl, and a conduit swingingly connecting the trawl to said float and through which the catch may be carried to said float by the inrushing waters caused by the trawl being towed through the water.

In testimony whereof I have hereunto set my hand.

JOHN W. ENRIGHT.